United States Patent [19]

Li et al.

[11] 3,897,308

[45] July 29, 1975

[54] IMMOBILIZED ENZYMES AND METHOD FOR PREPARATION

[75] Inventors: Norman N. Li, Edison, N.J.; Donald R. Brusca, Falls Church, Va.; Raam R. Mohan, Berkeley Heights, N.J.

[73] Assignee: Exxon Research and Engineering Company, Linden, N.J.

[22] Filed: Apr. 23, 1973

[21] Appl. No.: 353,822

Related U.S. Application Data

[63] Continuation-in-part of Ser. No. 141,367, May 7, 1971, Pat. No. 3,740,315.

[30] Foreign Application Priority Data

May 2, 1972    Italy................................... 4999/72

[52] U.S. Cl..................................... 195/63; 195/68
[51] Int. Cl.............................................. C07g 7/02
[58] Field of Search................................ 195/63, 68

[56] References Cited
UNITED STATES PATENTS

| | | | |
|---|---|---|---|
| 2,343,136 | 2/1944 | Dobson et al..................... | 195/63 X |
| 3,627,688 | 12/1971 | McCarty et al................... | 195/68 X |
| 3,682,842 | 8/1972 | Innerfield......................... | 195/63 X |
| 3,697,451 | 10/1972 | Mausner et al.................. | 195/63 X |

*Primary Examiner*—Lionel M. Shapiro
*Attorney, Agent, or Firm*—Robert J. Baran; Joseph John Allocca

[57] ABSTRACT

The instant invention relates to immobilized enzymes which comprise an enzyme containing-solution emulsified in immiscible liquid. Preferably the enzyme containing-solution is aqueous and will comprise from about 0.1 to about 10 weight percent enzyme. A surfactant is provided in the immiscible liquid to stabilize the emulsion, the surfactant comprising from 0.01 to 90 weight percent, preferably 0.5 to 20 weight percent of the immiscible liquid. The instant invention also relates to a general procedure for preparing immobilized enzymes by emulsifying a solution containing said enzyme in an immiscible liquid. The emulsions of the instant invention are designed to be stable at the conditions at which the immobilized enzymes will be utilized. For example, in a chemical conversion process wherein phenol is oxidized in the presence of the immobilized enzymes of the instant invention, e.g. an aqueous phenol oxidase containing solution emulsified in a hydrocarbon, e.g. cyclohexane, sufficient surfactant is added to said hydrocarbon liquid so as to provide an emulsion which does not break down during the contact with the phenol reactant.

2 Claims, No Drawings

IMMOBILIZED ENZYMES AND METHOD FOR PREPARATION

CROSS REFERENCE TO RELATED APPLICATIONS

The instant application is a continuation-in-part of U.S. Ser. No. 141,367 filed in the names of N. N. Li, R. R. Mohan and D. R. Brusca on May 7, 1971, now U.S. Pat. No. 3,740,315.

FIELD OF THE INVENTION

The instant invention relates to immobilized enzymes which comprise an enzyme containing-solution emulsified in immiscible liquid. Preferably the enzyme containing solution is aqueous and will comprise from about 0.1 to about 10 weight percent enzyme. The immiscible liquid will comprise from 0.01 to 90 weight percent of a surfactant whereby a stable emulsion of said enzyme containing-solution may be prepared. The immiscible liquid may also comprise other additives such as ion exchange compounds and viscosity index improvers. The surfactant itself may provide for ion exchange or viscosity index improvement.

The instant invention also relates to a general procedure for preparing immobilized enzyme by emulsifying a solution containing said enzyme in an immiscible liquid. The emulsions of the instant invention are designed to be stable at the conditions at which the immobilized enzymes will be utilized. For example, in a chemical conversion process wherein phenol is oxidized in the presence of the immobilized enzymes of the instant invention, e.g. an aqueous solution of phenol oxidase emulsified in a hydrocarbon, e.g. cyclohexane, sufficient surfactant is added to said hydrocarbon liquid so as to provide an emulsion which does not break down during the contact with the phenol reactant.

Many important commercial processes utilize enzyme catalysts, thus processes for immobilizing enzymes have become more important in recent years. For example, some enzymes which are used in commercial processes include amylase, glucose oxidase, acylase, phenolase, urease, catalase, protease, lipase, zymase complex, amidase, starch-glucogenase, cholinesterase, aspartase, and asparaginase. Because of the cost of the enzyme, any process where an enzyme catalyst is utilized, recovery of the enzyme from the reaction products is an important factor in the success of the process. Thus, in some processes, the enzyme is isolated from the reactant containing feed stream by use of solid membranes.

More recently the enzymes have been attached to insoluble materials whereby a heterogeneous enzyme catalyst is prepared. For example, see U.S. Pat. No. 3,519,538 which teaches a process wherein enzymes are bound to glass. See also U.S. Pat. Nos. 3,126,324; 3,223,593; 3,278,392; 3,536,587; 3,542,662; and 3,594,325 hereby cited for illustration.

In all of the above procedures, the enzyme immobilization process is difficult and suffers from many disadvantages. For example, enzyme activity is usually reduced by attaching it to a solid. Further, the solid support usually cannot be reclaimed in an enzyme uncontaminated state and thus, when activity decreases, i.e. when significant denaturation occurs, the solid support must be discarded.

In many of the above-cited examples of enzyme immobilization, the support must be activated, e.g. by providing enzyme reactive functional groups on the support surface. Thus necessarily the immobilization is a two-step process.

In processes wherein the enzyme is isolated by a solid membrane there is the added problem of bringing the reactants into contact with the enzyme at an effective rate. That is, the membranes must be very thin in order to obtain the reaction rates needed in commercial processing. Of course, the thinness of the membrane is limited by the mechanical wear properties of the membrane material. Thus, the skilled engineer when designing enzyme processes of this sort must accept a compromise between reaction rate and membrane wear.

Further problems with solid membranes include high cost, pinholes, difficulty in controlling porosity (selectivity), etc.

SUMMARY OF THE INVENTION

A novel process for immobilizing enzymes and the immobilized enzymes thereof has now been unexpectedly discovered. In this process an enzyme containing solution is emulsified in an immiscible liquid. The resulting immobilized enzyme, i.e. enzyme emulsion, may be conveniently utilized in chemical processing by dispersing the emulsion in a reactant containing feed stream for a time sufficient to obtain the desired chemical reaction. The emulsion is designed so as to be immiscible with the reactant containing feed stream. That is, when the feed stream is aqueous a hydrocarbon liquid may be used for preparing the enzyme emulsion. Further, the enzyme emulsion is designed so as to selectively allow the reactants of the feed stream to permeate through the immiscible liquid into the interior phase of the emulsion wherein the reactants are contacted with the enzyme. The reactants are converted to reaction products in the interior phase of the emulsion, and said reaction products may permeate back through the immiscible liquid into the feed stream. Thus, in effect, the immiscible liquid, i.e., the exterior phase of the emulsion, forms a liquid membrane around said enzyme containing solution.

It is obvious that in order to function within the scope of the invention, the emulsion may be formulated so as to be stable at conditions wherein the enzyme will be contacted with the feed stream. That is, the emulsion must not break thereby spilling the enzyme into the feed stream. To obtain stable emulsions a surfactant is provided in said immiscible liquid. The surfactant thus will be chosen to be soluble in the immiscible liquid. In general, to prepare the immobilized enzymes of the instant invention, an enzyme solution, preferably an aqueous enzyme solution, is mixed with an immiscible liquid, e.g. a hydrocarbon containing from about 0.1 to about 10 weight percent of surfactant, at conditions at which stable emulsion is formed. The procedure of the instant invention is general and may be used to immobilize any enzyme.

The enzymes subject to the instant invention may be selected from the group consisting of hydrolases, oxidoreductases, transferases, lyases, isomerases and ligases. The preferred enzymes are the hydrolases, including proteolytic enzymes which hydrolyze proteins, e.g. papain, ficin, pepsin, trypsin, chymotrypsin, bromelin, keratinase; carbohydrases which hydrolyze carbohydrates, e.g. cellulase, amylase, maltase, pectinase, chitinase; esterases which hydrolyze esters, e.g. lipase, cholinesterase, lecithinase, alkaline and acid phosphatases; nucleases which hydrolyze nucleic acid, e.g. ribonuclease, desoxyribonuclease; and amidases which hydrolyze amides, e.g. arginase, aspariginase, glutaminase, and urease; and the oxidoreductases including glucose oxidase, catalase, peroxidase, lipoxidase, and cytochrome reductase, as well as those mentioned specifically above.

The surfactant utilized for preparing the immobilized enzymes of the instant invention may be selected from the group consisting of anionic, cationic, or nonionic surfactants.

The following anionic surfactants are useful for the process of the instant invention: carboxylic acids, including fatty acids, rosin acids, tall oil acids, branched alkanoic acids, etc.; sulfuric acid esters, including alcohol sulfates, olefin sulfates, etc.; alkane and alkylaryl sulphonates, including alkyl benzene sulfonates, alkyl naphthalene sulphonates, etc.; phosphoric acid esters, including mono and dialkyl phosphates.

The following cationic surfactants are useful for the process of the instant invention: quaternary amine salts.

Nonionic surfactants are the preferred surfactant type for the practice of the process of the instant invention. A useful group of nonionic surfactants include the polyethenoxyether derivatives of alkyl phenols, alkylmercaptans, and alcohols, e.g. sorbitol, pentaerythritol, etc.

Particular nonionic surfactants for use in the instant process include compounds having the general formula

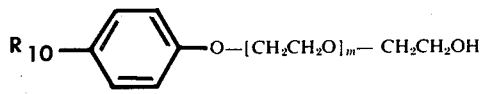

wherein $R_{10}$ may be $C_8H_{17}$, $C_9H_{19}$, or $C_{10}H_{21}$ and m is an integer varying from 1.5 to 8.

The most preferred nonionic surfactant is Span 80, a fatty acid ester of anhydro sorbitol condensed with ethylene oxide.

Short-chain fluorocarbons with polar groups are frequently sufficiently soluble in hydrocarbon oils to function as surfactants. Long-chain fluorocarbons attached to a hydrocarbon chain of sufficient length are soluble in hydrocarbon oils.

Silicone oils differ broadly in their chemical structure and surface-active properties. Those of sufficiently low molecular weight to be soluble in the hydrocarbon solvent and which contain only $CH_3$ groups attached to silicon in the $(Si-O)_n$ skeleton can be expected to be surface-active.

Since the number of surfactants is extremely large, it is not intended to burden this application with numerous examples. The following publications may be referred to for further examples: Surface Chemistry by Lloyd I. Osipow, Reinhold Publishing Company, New York (1962) chapter 8 and Surface Activity, Moilliet et al, Van Nostrand Company, Inc. (1961), Part III.

The preferred surfactants for use in preparing the immobilized enzymes of the instant invention are the above described nonionics, since these surfactants appear to be most compatible with enzymes in general, i.e. nonionics do not significantly denature enzymes.

The preferred immobilized enzymes of the instant invention comprise an aqueous enzyme containing solution emulsified in a hydrocarbon solvent, thus surfactants which are soluble in hydrocarbons are preferred.

In a less preferred alternate, the enzyme may be immobilized in the aqueous exterior phase of an emulsion, said immobilized enzyme being useful for the conversion of reactants present in an aqueous immiscible feed stream. In this embodiment the surfactant is preferably water soluble so that more stable emulsions are formed.

The emulsions of the instant invention may be prepared by various methods. Weight ratios of from 0.1 to 1.8, preferably of from 0.5 to 1.0, of the enzyme solution to the immiscible liquid used to form the exterior phase of the emulsion are mixed together at high shear for a time sufficient to form a stable emulsion. Methods for forming emulsions are well known to the skilled artisan and include highspeed stirrers, colloid mills, valve homogenizers, ultrasonic generators, and mixing jets. However, it should be noted that enzymes, being high molecular weight compositions, are somewhat sensitive to shear, and thus the minimum shear required to form a stable emulsion should be used.

In general, surfactants will comprise at least .01 weight percent, preferably from about 0.01 to about 10 weight percent of the immiscible liquid, more preferably from .1 to 5 weight percent.

Immiscible liquid is selected to be immiscible with the enzyme containing solution. In general, the enzyme containing solution being aqueous, the immiscible liquid will be an organic immiscible liquid, e.g. hydrocarbons, including halogen, nitrogen and oxygen and derivatives thereof. For example, immiscible liquids are fluorinated, chlorinated, amino, alkoxy, etc. substituted hydrocarbons containing up to 50, preferably 30, carbon atoms. The preferred immiscible liquids are the fluorocarbons, including the chlorofluorocarbons and the perfluorocarbons, and the highly branched isoparaffins since compounds of these classes generally do not react with, and do not substantially denature, enzymes. The immiscible liquid, as stated above, is selected so as to be immiscible with the feed stream, with which the immobilized enzymes will be contacted during the use of said enzymes in chemical processing. In general, the enzyme solution, i.e. interior phase of the enzyme emulsion, will be aqueous and thus liquids that are immiscible with the aqueous containing enzyme solution would also be immiscible with aqueous feed streams. The immiscible liquid, which functions as a liquid membrane, is further designed to allow the permeation of selected reactants present in the feed stream. For example, when the reactant is phenol, an immiscible liquid comprising a nonionic surfactant and a hydrocarbon oil may conveniently be used in preparing the immobilized enzymes as the instant invention. See, for example, U.S. Pat. No. 3,617,546 for further disclosure of this type of liquid membrane.

One class of preferred liquid membrane formulations is disclosed and claimed in U.S. Pat. No. 3,779,907 hereby incorporated by reference.

Further techniques which are useful for preparing the stable emulsions of the instant invention include the incorporation of thickeners and viscosity index improvers in the immiscible liquid. Oil soluble thickeners are well known to the skilled artisan working in the art of oil formulation and need not be enumerated here. The thickeners act to increase the viscosity of the immiscible liquid, i.e. the exterior phase of the emulsion, thus decreasing the tendency toward rupture under the shear conditions encountered during use of the immobilized enzymes in chemical processing.

Viscosity index (V.I) improvers are also well known to the skilled oil formulator. V.I. improvers act to maintain the viscosity of the immiscible liquid at higher temperatures, thus decreasing the tendency toward rupture due to viscosity decrease when higher temperatures are utilized during processing.

The emulsions of the instant invention are prepared to be stable at the conditions at which the immobilized enzyme will be contacted with the feed stream. Enzymes in general are utilized at rather mild conditions, i.e. from about 15° to 45°C and generally at ambient pressures. The immobilized enzymes are subject to agitation during use, as described below, thus the emulsions are also designed to be stable at low to moderate shear conditions. The skilled artisan knowledgeable in emulsion technology, with the instant disclosure before him may readily prepare emulsions which will be stable at these conditions.

The immobilized enzymes of the instant invention offer various important advantages in enzyme processing. For example, the emulsion may be designed so that the enzyme may be contacted with a feed stream containing denaturants which would destroy the enzyme if contacted directly therewith, but, by use of the liquid membrane concept, are maintained separate from the enzymes. For example, denaturants such as metal ions, strong acids and bases, cyanide ions, CO, azide ions, etc., may be isolated from the enzyme by proper design of the emulsion, while allowing reactants present along with said denaturants through the immiscible liquid into contact with the enzyme.

The enzyme containing solution may further contain various buffers, etc., which may be used to provide an optimum environment for reaction of the enzyme with the desired reactants.

The enzyme containing solution may contain cofactors, activating metals, enzyme stabilizers, e.g. glycerol, sucrose, urea, etc., along with the enzyme.

Alternatively, the enzyme may be oligomerized or absorbed on a solid support within the enzyme containing solution. In general, however, these additional methods of stabilization are not needed with the immobilized enzymes of the instant invention.

The reaction products obtained during use of the immobilized enzymes of the instant invention may be collected in the enzyme containing solution or may permeate back out into the feed stream. Preferably the immobilized enzymes will be designed so as to allow the permeation of the reaction products back out after contact with the enzyme. This is conveniently done by choosing an immiscible liquid wherein the reactant is soluble and thus permeates through and into the enzyme containing solution and further designing the emulsion so that the immiscible liquid is also permeable to the reaction product. Thus, transfer through the immiscible liquid and both directions is obtained. Alternatively the immiscible liquid may be designed so as to allow the transfer of the reactants through the membrane and trapping of the reaction products in the enzyme containing solution by the insolubility of said reaction products in the immiscible liquid. In this variation, the reaction products must be recovered by breaking the emulsion.

The immobilized enzyme of the instant invention is utilized by mixing the above-described emulsion with the reactant containing feed stream. In general, said mixing is done at low shear rates, e.g. from 100 to 200 RPM's so as not to break the emulsion thereby mixing the enzyme with the feed stream. During processing the immobilized enzyme is present as droplets of the emulsion suspended in the reactant containing the feed stream. Each of the individual droplets of the emulsion comprise many tiny droplets of enzyme containing solution surrounded by the immiscible liquid. Thus, the analogy to a membrane is clearly seen. As the emulsion droplets break up and coalesce, under agitation, large liquid membrane surface areas are provided whereby reactants from the feed stream may permeate through the immiscible liquid into the enzyme solution contained therein. As stated above, the reactants are converted to reaction products in said enzyme containing solution and they may permeate back out into the reactant containing feed stream.

The agitation is continued for a time sufficient to give the desired conversion and then the immobilized enzyme is collected by merely discontinuing the agitation whereby the enzyme emulsion being immiscible with the reactant feed stream separates either at the top or the bottom of the reaction chamber. The immobilized enzyme is then collected and may be reused in further processing. Alternatively the emulsion may be broken and the enzyme containing solution separated therefrom. In this manner more enzyme may be added to the enzyme containing solution to make up for any enzyme denatured.

The immobilized enzyme of the instant invention may also be utilized in a continuous manner, see for example the processing described in U.S. Pat. Nos. 3,410,794 and 3,454,489.

The following are the specific embodiments of the instant invention.

EXAMPLE 1 - HYDROCARBON HYDROXYLATION SYSTEM

The reaction-separation system employed here is used to selectively produce and isolate 1-octanol from n-octane. The membrane-contained catalyst utilized to effect this specific conversion is the enzyme ω-hydroxylase, which is isolated from pseudomonas oleovorans by the method described by E. J. McKenna and M. J. Coon, J. Biol Chem., 245, 3882–3889 (1970). This three-component enzyme can selectively convert n-alkanes to their corresponding 1-alkanols.

20 mg rubredoxin [prepared as described by J. A. Peterson and M. J. Coon, J. Biol. Chem., 243, 329–334 (1968)], 3 mg spinach ferridoxin-TPN reductase [prepared as described by M. Shim, K. Tagawa and D. I. Arnon, Biochem. Z., 338, 84 (1963)], 20 mg of pseudomonas ω-hydroxylase, and 1 g of nicotinamide adenine dinucleotide are dissolved in 60 g of 0.1M sodium phosphate buffer, pH 7.0. 140 g glycerol and 0.4 g saponin are added to the buffered catalyst solution. 200 g n-octane are added to the above surfactant solution and the mixture is subjected to a high shear field to produce a stable emulsion. This emulsion is quickly combined with 800 g water-saturated proprionaldehyde, stirred for one hour in air, and the propionaldehyde layer is allowed to separate on standing. The propionaldehyde containing 1-octanol is decanted from the emulsion and stripped at 49°C to yield the pure 1-octanol residue, which is collected. The emulsion phase is disrupted by centrifugation, additional octane is added, and the entire procedure is recycled as desired.

EXAMPLE 2- PHENOL OXIDATION SYSTEM

The reaction-separation system employed here is used to remove and oxidize small quantities of phenol from aqueous solution. The catalyst, polyphenol oxidase, is contained in the interior phase of a water in hydrocarbon emulsion to effect the desired separation and conversion.

The emulsion was prepared by mixing 2 g SPAN-80 (sorbitan monooleate), 1 g of a high molecular weight amine (a), and 97 g of an isoparaffin (carbon number range from about 25 to 35). 5 mg mushroom polyphenol oxidase catalyst (obtained as a lyophilized preparation from Worthington Biochemical Corp., Freehold, New Jersey) was dissolved in 100 g 0.05M tris buffer, pH 7.0 to produce the inside phase. The enzyme catalyst-containing inside phase and hydrocarbon surfactant phase were stirred at 500 rpm for 20 minutes to produce a stable emulsion. 115 g of 0.5 mM phenol in 0.05M tris buffer, pH 7.0 and 91.2 g of the emulsion were combined in a 250 ml separatory funnel. The removal of phenol from the outside phase was monitored by sampling this phase after 12

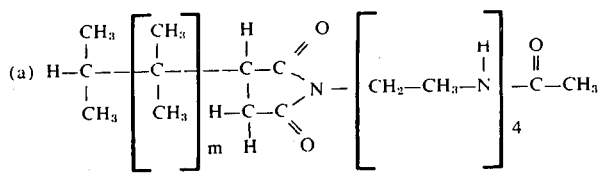

$m$ is an integer of about 40, giving said polyamine derivative a molecular weight of about 2,000 and 18 hand shakes of the separatory funnel. The absorbence difference between 270m$\mu$ and 245m$\mu$ was used as a measure of phenol concentration.

| Number of Shakes | Phenol In Outside Phase ($A_{270}$–$A_{245}$) |
|---|---|
| 0 | 0.79 |
| 12 | 0.51 |
| 18 | 0.36 |

The results indicate that phenol is rapidly removed from the outside phase. Likewise, the appearance of oxidized product in the inside phase was confirmed by comparison of the ultraviolet spectrum of that phase, following centrifugation at 10,000 rpm for 20 minutes, with the spectrum of known oxidized product. The oxidized product is characterized by the relatively high $A_{245}/A_{270}$ ratio of 1.03 as compared with 0.12 for the initial phenol reactant.

EXAMPLE 3 - PHENOL OXIDATION SYSTEM

The catalyst, polyphenol oxidase, is contained in an aqueous surfactant membrane. Phenol is cyclohexane solution permeates from the outside phase through the membrane, which it is oxidized. The oxidized product is recovered in the inside cyclohexane phase.

The aqueous surfactant membrane was prepared by combining 0.4 g saponin, 10 mg mushroom polyphenol oxidase (Worthington Biochemical Corp.), 100 g glycerol, and 99.6 g 0.05M tris buffer, pH 7.0. This membrane was stirred at 500 rpm for 20 minutes with 200 g spectral grade cyclohexane to produce a stable emulsion. 100 ml of this emulsion was combined with 100 ml of a phenol solution in cyclohexane (0.1 g/200 g) in a 250 ml separatory funnel. The removal of phenol from the outside phase was monitored by sampling this phase after 3, 6, 12, 18 and 24 hand shakes of the separatory funnel. The absorbence difference between 265 m$\mu$ and 240 m$\mu$ was used as a measure of phenol concentration.

| Number of Shakes | Phenol in Outside Phase ($A_{265}/A_{240}$) |
|---|---|
| 0 | 1.85 |
| 3 | 1.39 |
| 6 | 0.95 |
| 12 | 0.63 |
| 18 | 0.44 |
| 24 | 0.35 |

The results indicate that phenol is rapidly removed from the outside phase. Likewise, the appearance of oxidized product in the inside phase was confirmed by comparison of the ultraviolet spectrum of that phase, following centrifugation at 10,000 rpm for 20 minutes with the spectrum of known oxidized product. The oxidized product in cyclohexane is characterized by the relatively high $A_{240}/A_{265}$ ratio of 0.56 as compared with 0.08 for the initial phenol reactant in cyclohexane.

EXAMPLE 4 - NITRATE REDUCTION SYSTEM

In this experiment a simulated waste water stream (1 percent $KNO_3$ at pH 6.8) is contacted with a liquid membrane system comprising 2 percent sorbitan monooleate, 5 percent of a high molecular weight amine (a) and 93 percent of the isoparaffin of Example 2 as the exterior phase. The interior phase comprises 25 ml of nitrate reductase having 5 percent specific activity, 20 gms of sucrose and an indicator (b). After 30 minutes, the indicators in the interior phase changed from colorless to rose pink indicating that the nitrates have permeated from the simulated waste water into the interior phase and reduced to lower oxides of nitrogen.

(b) The indicator is prepared by mixing in equal amounts a solution of 0.5 g of d-naphthylamine in 100 ml of 5N acetic acid with a solution of 0.8 g of sulfanilic acid in 100 ml of 5N acetic acid. The indicator is added dropwise to the aqueous solution of the enzyme and sucrose.

The above experiment was run in a separatory funnel in the following manner. The simulated waste water phase was transferred to the separatory funnel, followed by the exterior phase, which being of lighter density and immiscible with the waste water phase, formed a distinct layer over the waste water phase. The enzyme solution was added dropwise, forming droplets coated with the exterior phase, which sank to the bottom of the separatory funnel. As the droplets fell through the waste water phase, the nitrates present therein permeated into the interior phase and reduced therein biocatalytically to lower oxides of nitrogen.

EXAMPLE 5 - NITRITE AND NITRATE REDUCTION SYSTEM

In this experiment a simulated waste water stream containing 10–1000 ppm nitrite or 10–1000 ppm nitrate at pH 6.0 – 8.0 was contacted with an emulsion, the exterior phase of which comprises, by weight, 2 percent Sorbitan monooleate, 10 percent of the high molecular weight amine of Example 2, 84 percent of isoparaffin and 4 percent Amberlite LA-2 (high molecular weight water insoluble, hydrocarbon soluble liquid secondary amine resin, obtained as a liquid preparation from Rohm and Haas Company, Independence Mall West, Philadelphia, Pa.), the interior phase of which comprises 25 ml of an aqueous solution of nitrite or nitrate reductase having a 5 percent specific activity at pH 7.5. After 60 minutes of contact time, i.e. mixing the emulsion and the waste water stream at low shear, the nitrite concentration determination in the external phase indicated that all the nitrate had permeated from the simulated waste water into the interior phase of the emulsion and reduced to lower oxides of nitrogen.

The above experiment was run in a resin kettle fitted with a stopcock at the bottom in the following manner. The simulated waste water phase containing calculated amounts of nitrite or nitrate was transferred to the reaction vessel, followed by the emulsion which, being of lighter density and immiscible with the waste water phase, formed a distinct layer over the waste water phase. The emulsion and the aqueous phases were stirred at 200 rpm and residual nitrite or nitrate concentrations in the simulated waste water phase were monitored by sampling the phase after 0, 15, 30, 45 and 60 minutes of contact. Reduction in the nitrite or nitrate concentration in the waste water was used to determine the permeation of the nitrite or nitrate into the interior phase and the biocatalytical reduction therein to lower oxides of nitrogen.

TABLE I

| Time in Minutes | % Permeation of Nitrite From External Waste Water Phase |
| --- | --- |
| 0 | 0 |
| 15 | 50 |
| 30 | 58 |
| 45 | 66 |
| 60 | 70 |

The results (Table I) indicate that nitrite is rapidly removed from the waste water stream. Likewise, the permeating or removal of nitrate from the simulated waste water stream was monitored by determining the residual nitrate in the waste water stream (Table II).

TABLE II

| Time in Minutes | % Permeation of Nitrate From External Waste Water Phase |
| --- | --- |
| 0 | 0 |
| 15 | 40 |
| 30 | 55 |
| 45 | 75 |
| 60 | 85 |

EXAMPLE 6 - NITRITE REDUCTION SYSTEM

In this experiment a simulated waste water stream containing 1 percent $KNO_2$ at pH 6.8 is contacted in the manner described in Example 5 with an emulsion, the exterior phase of which comprises 2 percent Sorbitan monooleate, 10 percent of the high molecular weight amine of Example 2, varying amounts of Amberlite LA-2, and sufficient quantities of the isoparaffin of Example 2 to make up to 100 percent. The interior phase of the emulsion comprised 25 ml of an aqueous solution of nitrite reductase having 5 percent specific activity at pH 7.5 as the interior phase. The time required for complete permeation of the nitrite from the external phase was obtained by monitoring the nitrite concentration in the simulated waste water phase. The results indicate that a concentration of 4–8 percent of Amberlite LA-2 is optimal for the system.

The above experiment was run in a resin kettle reaction vessel fitted with a stopcock at the bottom. The simulated waste water phase was transferred to the reaction vessel, followed by the emulsion which, being of lighter density and immiscible with the waste water phase, formed a distinct layer over the waste water phase. To effect intimate contact both phases were stirred at 200 rpm. Samples of waste water phase were analyzed at convenient time intervals to determine which emulsion composition was optimal. The results (Table III) indicate that incorporation of 4 to 8 percent of Amberlite LA-2 facilitates the nitrite permeation rapidly from the simulated waste water stream through the external phase of the emulsion into the internal phase wherein it is biocatalytically reduced to lower oxides of nitrogen. The experiment demonstrates that the emulsions of the instant invention may be readily designed by varying the various components which make up the exterior phase, to increase the rate of transfer of the species which is to be reacted with the enzyme. The permeation rate through solid membranes can be varied only with a substantially greater degree of difficulty, thus demonstrating that the emulsion encapsulation technique taught in the instant specification will be very useful in the field of immobilized enzymes.

TABLE III

| % Amberlite LA-2 | Time in Minutes for 100% Nitrite Permeation |
| --- | --- |
| 0 | >180 |
| 2 | ~120 |
| 4 | 80 |
| 8 | 90 |
| 10 | 130 |

What is claimed is:

1. An immobilized enzyme comprising an aqueous solution of the enzyme emulsified in an immiscible liquid which immiscible liquid comprises a hydrocarbon or a fluorinated hydrocarbon diluent and further wherein the immiscible liquid comprises a surfactant which is from about 0.01 to 10 weight percent of said immiscible liquid, the immobilized enzyme being selected from the group consisting of phenol oxidase, nitrate reductase and urease.

2. A method for preparing an immobilized enzyme which comprises emulsifying an aqueous enzyme containing solution in a water immiscible liquid wherein said water immiscible liquid is a hydrocarbon or a fluorinated hydrocarbon and said water immiscible liquid further comprising from about 0.01 to 10 weight percent of a surfactant, and said enzyme is selected from the group consisting of phenol oxidase, nitrate reductase and urease.

* * * * *